Sept. 30, 1924.
F. C. KINNEAR
SPRAYING DEVICE
Filed June 11, 1923
1,510,175
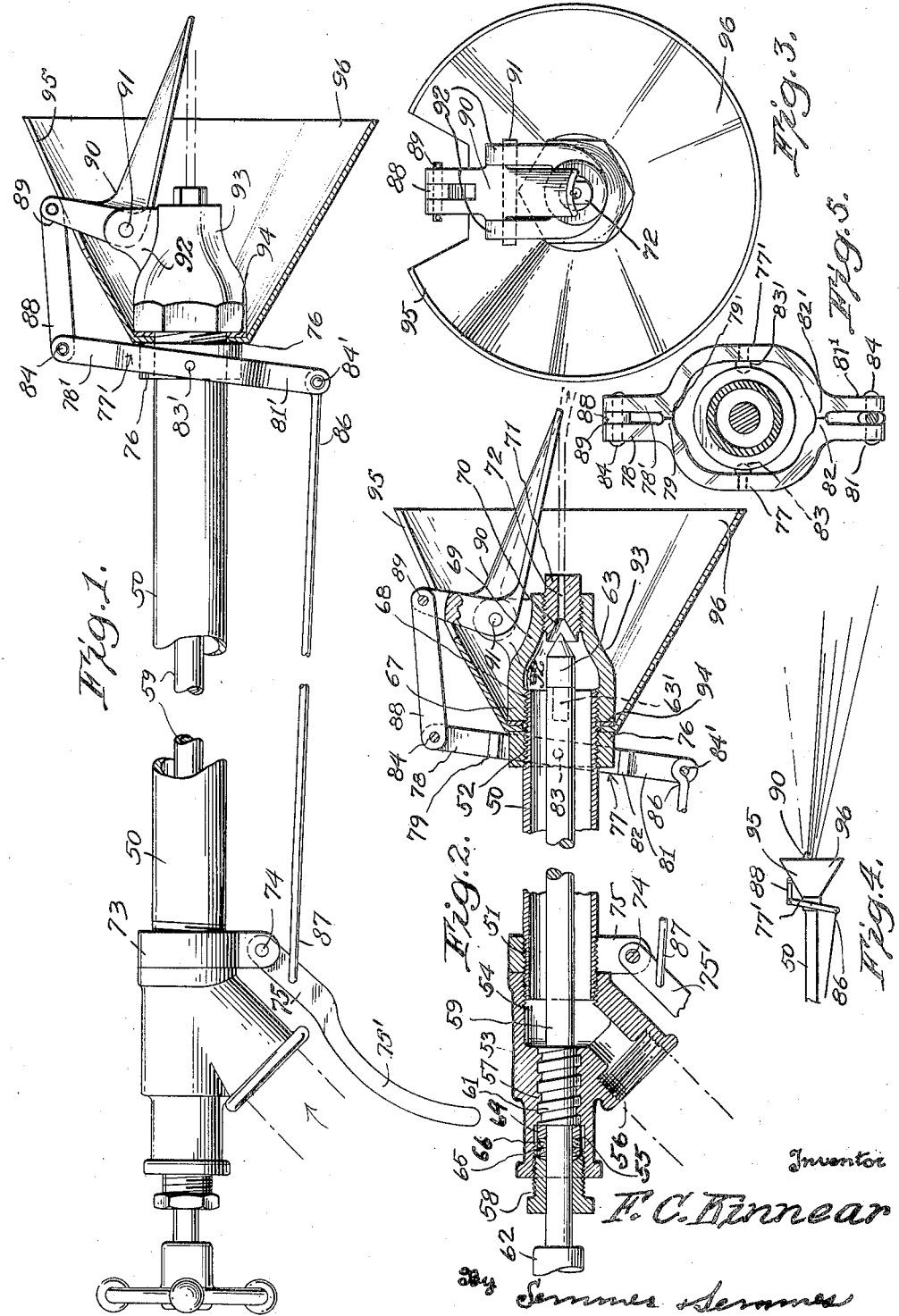
Inventor
F. C. Kinnear
By Semmes Semmes
Attorneys Patented Sept. 30, 1924.

1,510,175

UNITED STATES PATENT OFFICE.

FRANK C. KINNEAR, OF NEW WATERFORD, OHIO.

SPRAYING DEVICE.

Application filed June 11, 1923. Serial No. 644,638.

*To all whom it may concern:*

Be it known that I, FRANK C. KINNEAR, a citizen of the United States, residing at New Waterford, in the county of Columbiana and State of Ohio, have invented certain new and useful Improvements in Spraying Devices, of which the following is a specification.

This invention relates to certain new and useful improvements in sprayers such as are used for spraying either orchards or ornamental trees or vines attacked by various forms of insect life, such as caterpillars, etc.

One of the objects of my invention is to construct a spraying gun in such manner as to minimize the loss of the liquid sprayed. This I accomplish by the peculiar form of deflector located just beyond the nozzle of the gun, which deflects the spray into the form of a crescent (in cross section). The distance between the ends of the crescent may be varied as desired by the operator, from 10 to 15 feet. By spraying from the top of the tree downwards, little or none of the spray need be lost, but all of it can be accurately directed upon the tree. In this way I am enabled to effect a saving in the spraying material of from thirty to forty per cent.

Another object of my invention is to provide a protector for the operator's hand, and prevent any of the spray which is of poisonous nature from trickling down from the nozzle to his hand and injuring it.

A further object of my invention is to provide an adjustable valve for the sprayer whereby the amount of water discharged can be easily regulated so as to throw a solid stream to a considerable distance, and also to provide a deflector mounted upon and extending beyond the nozzle by means of which the operator can readily control the fineness or density of the spray.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings:

Figure 1 is an enlarged side elevation partly in section of my improved sprayer, showing the spray-guard in section;

Figure 2 is a longitudinal sectional view of Fig. 4, partly in section;

Figure 3 is an end view looking towards the nozzle of the sprayer;

Figure 4 is a diagrammatic view showing the spraying effect produced by the deflector upon the liquid after it has left the nozzle; and Figure 5 is a detail view of the sectional yoke encircling the coupling on the forward end of my sprayer.

Like reference numerals indicate like and corresponding features throughout the several views.

The numeral 50 represents the body of my improved spraying gun, the same being made of metal and exteriorly threaded at each end 51 and 52. The end 51 is provided with a coupling 53 having three openings 54, 55 and 56, each of which is interiorly screw-threaded, as seen in Figure 2. The central portion of this coupling is provided with a female spiral or worm thread 57 and screwed into the rear portion of the coupling is an exteriorly screw-threaded thimble 58 through which extends a rod or spindle 59 having an exterior male worm thread 61 adapted to fit into the corresponding female worm thread 57 of the coupling. The rear end of this rod 59 is provided with a hand wheel 62, and the other end terminates in a point, which may be constructed integrally with the rod or as a separate unit or head 63, in which case the shank 63' is adapted to fit into the bored end of the rod 59 as indicated in dotted lines in Figure 2. Number 64 is a metallic washer and 65 and 66 leather or fibre packing rings, through which the spindle extends, and which prevent the leakage of the liquid rearwardly. On the other end of the body 50 is fitted a forward coupling or nozzle 67 interiorly screw-threaded at its rear end 68 so as to fit snugly thereon, the forward portion 69 of said nozzle being made smaller than the rear portion and being also interiorly screw-threaded for the purpose of receiving exteriorly screw-threaded detachable interchangeable mouth pieces 71, which may be bored to discharge streams of different diameters. The rear portion of this mouth piece flares into a V-shaped formation, as at 70, to correspond with the pointed rod 59, and forming a seat therefor, the two forming thus a cone valve and seat. The remaining portion of said mouth piece is centrally bored with a small passageway 72, so that the liquid ejected therethrough issues into the air in a small round volume of considerable force.

Around the rear coupling is a yoke 73, formed of one piece, adapted to hug tightly the body of the sprayer, the ends of which yoke extend downwardly and are each centrally bored for the reception of a clasping bolt 74 which extends therethrough. Between the ends of the yoke and mounted upon the clasping bolt is one end of an operating lever 75 having a curved handle or trigger 75' by means of which the sprayer is operated, as will hereinafter more fully appear. Around the fore portion of the body is a metallic band or ring 76 closely shrunk thereon and having on each side V-shaped indentations; see Figure 5. Around this band is another yoke, not an integral one however but composed of two sections or members 77 and 77', having upwardly extending ends 78 and 78', provided each with a shoulder 79 and 79', and downwardly extending ends 81 and 81' each having a shoulder 82 and 82'. The members 77 and 77' are provided at their centers with projecting cone shaped bearing pins 83 and 83', respectively, adapted to enter into the indentations, and to turn therein when the two sections are fastened together at the top and bottom by bolts 84. This yoke is composed of two members in order that the top and bottom portions may be spread apart somewhat for the reception at the lower end, of one end of a connecting rod 86, the other end 87 of which is attached to the handle, and, at the upper end, for the reception of one end of a link 88, the other end 89 of which is attached to the upper end of the bell crank shaped deflector 90, whose lower surface is concave in cross section. This deflector is pivotally and demountably positioned at 91 between the sides of a bifurcated lug 92 upon the nose of the forward coupling. The purpose of the several rods referred to is to enable the operator to control by means of the handle or trigger 75', the manipulation of the deflector in such a manner as to regulate the density or fineness of the spray and also its direction.

Immediately back of the nozzle or forward coupling 93 is a metallic washer 94 and between it and the band 76 is tightly fitted a flaring metallic screen or spray guard 95, the purpose of which is to catch any drippings from the stream of poisonous liquid as it is ejected from the gun, and prevent it from injuriously affecting the operator. It will be noted that this screen or guard prevents the travelling rearwardly of any of the drippings from the spray, and forces the same forwardly in the direction of the stream until they reach the lower edge of the shield at 96, where they will drop inocuously to the ground.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a sprayer, the combination with a body, a nozzle therefor, a shield enclosing the nozzle, a valve to control the volume of fluid passing therethrough, and a deflector adjustably mounted upon the nozzle and within the shield; of a coupling at the other end of the body for attachment to a hose, an operating handle adjacent said coupling, and intermediate means connecting the deflector with the handle, whereby the operator can control the density, shape and direction of the spray.

2. In a sprayer, the combination with a body, of a nozzle screw-threaded thereto, a shield enclosing the nozzle and having a portion fitting behind the screw-threaded portion thereof, a band screw-threaded to the body and adapted to hold the shield between it and the nozzle, a valve to control the volume of liquid passing through the nozzle, a deflector adjustably mounted upon the nozzle and within the shield, a coupling at the other end of the body for attachment to a hose, an operating handle adjacent said coupling, and intermediate means connecting the deflector with the handle, whereby the operator can control the density, shape and direction of the spray.

3. In a sprayer, the combination with a body, of a nozzle, a shield enclosing the nozzle, a valve to control the passage of liquid through the nozzle, a deflector adjustably mounted upon the nozzle and within the shield, a link pivotally connected at one end to the deflector structure, a lever member pivoted on the body and pivotally attached to the other end of the link, a connecting rod attached to the lever, and means to reciprocate the connecting rod to adjust the position of the deflector.

4. In a sprayer, the combination with a body, of a nozzle, a shield enclosing the nozzle, a valve to control the passage of liquid through the nozzle, a deflector adjustably mounted upon the nozzle and within the shield, a link pivotally connected at one end to the deflector structure, a lever member pivoted on the body and pivotally attached to the other end of the link, a connecting rod attached to the lever, and a pivotally mounted lever to which the other end of the connecting rod is attached.

5. In a sprayer, the combination with a body, of a nozzle screw-threaded thereto, a shield enclosing the nozzle and having a portion thereof fitting behind the screw-threaded portion of the nozzle, a band screw-threaded to the body and adapted to hold the shield between it and the nozzle, a deflector adjustably mounted on the nozzle and within the shield, a pivoted link connected at one end to the deflector structure, a lever member pivoted on the body and pivotally attached to the other end of the link, a connecting rod attached to the lever, and means to reciprocate the connecting rod to adjust the position of the deflector.

6. In a sprayer, the combination with a body, of a nozzle screw-threaded thereto, a shield enclosing the nozzle and having a portion thereof fitting behind the screw-threaded portion of the nozzle, a band screw-threaded to the body and adapted to hold the shield between it and the nozzle, a deflector adjustably mounted on the nozzle and within the shield, a pivoted link connected at one end to the deflector structure, a lever member pivoted on the body and pivotally attached to the other end of the link, a connecting rod attached to the lever, and a pivotally mounted lever to which the other end of the connecting rod is attached.

In testimony whereof I affix my signature.

FRANK C. KINNEAR.